(12) United States Patent
Park et al.

(10) Patent No.: US 11,938,822 B2
(45) Date of Patent: Mar. 26, 2024

(54) BUTTON STRUCTURE FOR VEHICLE AV SYSTEM AND METHOD OF OPERATING THE SAME

(71) Applicant: HYUNDAI MOBIS CO., LTD., Seoul (KR)

(72) Inventors: Sung Hyun Park, Hwaseong-si (KR); Jun Seong Seo, Yongin-si (KR); Sol Ji Yoo, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 24 days.

(21) Appl. No.: 17/804,834

(22) Filed: May 31, 2022

(65) Prior Publication Data

US 2023/0028186 A1   Jan. 26, 2023

(30) Foreign Application Priority Data

Jul. 21, 2021   (KR) .......................... 10-2021-0096077

(51) Int. Cl.
*B60K 37/06*   (2006.01)

(52) U.S. Cl.
CPC .............. *B60K 35/10* (2024.01); *B60K 35/28* (2024.01); *B60K 2360/139* (2024.01); *B60K 2360/1468* (2024.01); *B60K 2360/164* (2024.01); *B60K 2360/33* (2024.01)

(58) Field of Classification Search
CPC .............. B60K 37/06; B60K 2370/139; B60K 2370/1468; B60K 2370/164; B60K 2370/33; B60K 2370/115; B60K 2370/119; B60K 2370/131; B60K 2370/141; B60K 2370/152; H01H 13/83; H01H 13/14; H01H 13/023; H01H 13/10; H01H 2219/054;

(Continued)

(56) References Cited

U.S. PATENT DOCUMENTS

| 2004/0003986 | A1* | 1/2004 | Ito ........................ H01H 13/70 |
| | | | 200/6 R |
| 2006/0021861 | A1* | 2/2006 | Schmidt ............... H01H 13/702 |
| | | | 200/5 R |

(Continued)

FOREIGN PATENT DOCUMENTS

| KR | 2010-0053022 | 5/2010 |
| KR | 2019-0041115 | 4/2019 |

*Primary Examiner* — Christopher E Leiby
(74) *Attorney, Agent, or Firm* — DLA PIPER LLP (US)

(57) ABSTRACT

The button structure including a front panel configured to define a body and having a mounting hole formed in a front surface of the front panel directed toward an interior of an occupant compartment, a button unit accommodated in the mounting hole and configured to selectively control various types of AV systems of a vehicle, a detection unit accommodated in the front panel and configured to detect a user's hand, a switch unit configured to operate various types of AV systems of the vehicle under the control of the button unit, and a lighting unit accommodated in a housing and configured to emit light to the button unit in response to a detection signal of the detection unit, in which the detection unit is disposed rearward of the button unit and positioned from the button unit in a direction opposite to the direction toward the interior of the occupant compartment.

12 Claims, 10 Drawing Sheets

(58) Field of Classification Search
CPC ........ H01H 2219/062; H01H 2231/026; B60R 16/005; B60R 16/02
See application file for complete search history.

(56) References Cited

U.S. PATENT DOCUMENTS

| | | | | |
|---|---|---|---|---|
| 2014/0001834 | A1* | 1/2014 | Rudolph | B60K 37/06 307/9.1 |
| 2014/0210793 | A1* | 7/2014 | Eriksson | F24C 7/086 345/175 |
| 2014/0369573 | A1* | 12/2014 | Chiu | G06V 40/1306 382/124 |
| 2015/0088336 | A1* | 3/2015 | Shin | G06F 3/017 701/1 |
| 2015/0206669 | A1* | 7/2015 | Hauck | H03K 17/962 29/622 |
| 2017/0227119 | A1* | 8/2017 | Buttolo | B60K 20/08 |
| 2017/0274765 | A1* | 9/2017 | Woodhouse | B60K 37/06 |
| 2020/0356182 | A1* | 11/2020 | Kamepalli | G06N 20/00 |
| 2022/0371442 | A1* | 11/2022 | Matsuzawa | B60K 37/06 |

* cited by examiner

300: 310, 320
400: 410, 420, 430, 440

BUTTON STRUCTURE FOR VEHICLE AV SYSTEM AND METHOD OF OPERATING THE SAME

CROSS-REFERENCE TO RELATED APPLICATION

This application claims priority to and the benefit of Korean Patent Application No. 10-2021-0096077, filed on Jul. 21, 2021, the disclosure of which is incorporated herein by reference in its entirety.

BACKGROUND

Technical Field

The present disclosure relates to a button structure, and more particularly, to a button structure for a vehicle AV system and a method of operating the same.

Related Art

A vehicle audiovisual (AV) system refers to a vehicle audiovisual system provided in a vehicle and equipped with a car audio system as well as an image system such as a TV and a video system.

In general, the AV system is installed on an instrument panel disposed next to a driver seat and plays sound, images, and the like or receives a radio broadcast, thereby providing convenience for passengers in an interior of a vehicle.

The AV system includes button units or the like that a driver or passenger may push. Lighting devices are arranged behind the button units to emit light to the button units in the dark so that the user may identify the button units.

Meanwhile, most of the high-grade vehicles have detection units disposed below the button units and configured to detect the hand of the driver or passenger who intends to manipulate the AV system.

The detection unit detects the user's hand close to the button unit that the user intends to push to manipulate the AV system, such that the light is emitted to the corresponding button unit.

Therefore, the detection unit allows the AV system to exhibit luxurious quality.

However, the detection unit is generally disposed below the button units that constitute the AV system.

For this reason, there are problems in that an overall size of the AV system is inevitably increased, and the AV system occupies a large space of the instrument panel where the AV system is mounted.

Further, the detection unit is exposed to the outside of the instrument panel, which causes a problem of deterioration in luxurious quality of the vehicle interior.

Accordingly, those skilled in the corresponding field seek to find a solution capable of reducing the overall size and weight of the AV system and preventing the detection unit from being exposed to the outside of the instrument panel but have not obtained satisfactory results up to now.

SUMMARY

Various embodiments are directed to provide a button structure for a vehicle AV system and a method of operating the same, which are capable of reducing an overall size and weight of an AV system and preventing a detection unit from being exposed to the outside of an instrument panel.

The above-mentioned object, other objects, advantages, and features of the present disclosure and methods of achieving the objects, advantages, and features will be clear with reference to embodiments described in detail below together with the accompanying drawings.

In an embodiment, the present disclosure provides a button structure for a vehicle AV system, the button structure including: a front panel configured to define a body and having a mounting hole formed in a front surface of the front panel directed toward an interior of an occupant compartment; a button unit accommodated in the mounting hole and configured to selectively control various types of AV systems of a vehicle; a detection unit accommodated in the front panel and configured to detect a user's hand; a switch unit configured to operate various types of AV systems of the vehicle under the control of the button unit; and a lighting unit accommodated in a housing and configured to emit light to the button unit in response to a detection signal of the detection unit, in which the detection unit is disposed rearward of the button unit in the direction toward the interior of the occupant compartment.

The front panel may include: a plurality of mounting holes formed in the front surface of the front panel directed toward the interior of the occupant compartment; a coupling part extending from a rear surface of the front panel in a direction toward an engine room; and a guide part to which the button unit is rotatably coupled.

The button unit may include: a body part configured to define a body; and a rotary shaft disposed rearward of the body part and configured to fix the body part to the guide part so that the body part is rotatable.

An outer diameter of the body part may be smaller than an inner diameter of the mounting hole.

The body part may include: a planar portion formed in an upper region thereof; a push portion formed in a lower region of the planar portion; and a pressing portion extending from a rear side of the push portion.

A surface of the push portion directed toward the interior of the occupant compartment may further protrude than a surface of the planar portion directed toward the interior of the occupant compartment.

The detection unit may include: a prism coupled to a through-hole of the body part; a light-emitting part coupled to a rear side of the prism and configured to emit infrared rays forward in the direction toward the interior of the occupant compartment; a support fixed to the coupling part; and a light-receiving part coupled to the support and configured to receive the infrared rays that are emitted from the light-emitting part, reflected by a hand of a driver or passenger, and then returned.

The prism may disperse the infrared rays emitted from the light-emitting part so that the detection unit detects the hand of the driver or passenger close to the button unit.

The light-emitting part and the prism may be rotated together with the body part.

In another embodiment, the present disclosure provides a button structure for a vehicle AV system, the button structure including: a front panel configured to define a body and having a mounting hole formed in a front surface of the front panel directed toward an interior of an occupant compartment; a button unit accommodated in the mounting hole and configured to selectively control various types of AV systems of a vehicle; a detection unit provided in the front panel, disposed rearward of the button unit, and positioned from the button unit in a direction opposite to the direction toward the interior of the occupant compartment, the detection unit being configured to detect a user's hand; a switch unit configured to operate various types of AV systems of the vehicle under the control of the button unit; a lighting unit accommodated in a housing and configured to emit light to the button unit in response to a detection signal of the detection unit; and a smog layer coupled to the button unit, disposed at a position corresponding to the detection unit, and configured to prevent the detection unit from being exposed to the outside.

The smog layer may have the same color as a front surface of the button unit.

In still another embodiment, the present disclosure provides a method of operating a button structure for a vehicle AV system, in which the vehicle AV system includes: a front panel configured to define a body and having a plurality of mounting holes formed in a front surface of the front panel directed toward an interior of an occupant compartment; a screen unit disposed above the front panel and configured to receive an output signal from the outside and output various types of information; button units respectively accommodated in the plurality of the mounting holes and configured to selectively control various types of AV systems of a vehicle; a plurality of detection units accommodated in the front panel so as to respectively correspond to the button units and configured to detect a user's hand; and a plurality of lighting units accommodated in a housing, disposed rearward of the button units, and configured to emit light to the button units in response to detection signals of the detection units, and in which the plurality of the lighting units is turned on or off on the basis of a distance from the user's hand detected by the detection units.

The plurality of lighting units may be turned off when the user's hand is not detected by the detection units, the plurality of the lighting units may be turned on when the user's hand is as close as about 15 cm from the detection unit, the lighting unit of a first button unit closest to the user's hand and the lighting units of two second button units close to the first button unit, among the plurality of button units, may be turned on when the user's hand is as close as about 10 cm from the detection unit, and only the lighting unit of a third button unit closest to the user's hand, among the plurality of button units, may be turned on when the user's hand is as close as about 5 cm from the detection unit.

Information being lastly operated may be outputted on the screen unit when the user's hand is not detected by the detection units, menus corresponding to the plurality of the button units may be outputted on the screen unit when the user's hand is as close as about 15 cm from the detection unit, a first menu and a second menu respectively corresponding to the first button unit and the second button unit, among the plurality of button unit, may be enlarged and outputted on the screen unit when the user's hand is as close as about 10 cm from the detection unit, and a third menu corresponding to the third button unit may be outputted when the user's hand is as close as about 5 cm from the third button unit among the plurality of button units.

The plurality of the menus may be outputted on the information being lastly operated on the screen unit.

According to the present disclosure, the surface of the push portion directed toward the interior of the occupant compartment may further protrude than the surface of the planar portion directed toward the interior of the occupant compartment, thereby allowing the driver or passenger to easily push the push portion.

In particular, the detection unit fixed to the planar portion may effectively detect the hand of the driver or passenger even though the hand of the driver or passenger moves downward.

In addition, the detection unit may be provided in the front panel, disposed rearward of the button unit, and prevented from being exposed to the outside of the instrument panel, which makes it possible to improve the luxurious quality of the vehicle interior.

Further, the prism may disperse the infrared rays emitted from the light-emitting part to a large range, thereby allowing the detection unit to effectively detect the position of the hand of the driver or passenger close to the button unit to adjust volume, turning on/off, or frequency tuning of the AV system in the vehicle or adjust the heating or cooling mode of an air conditioning device.

DETAILED DESCRIPTION

Figure 1:
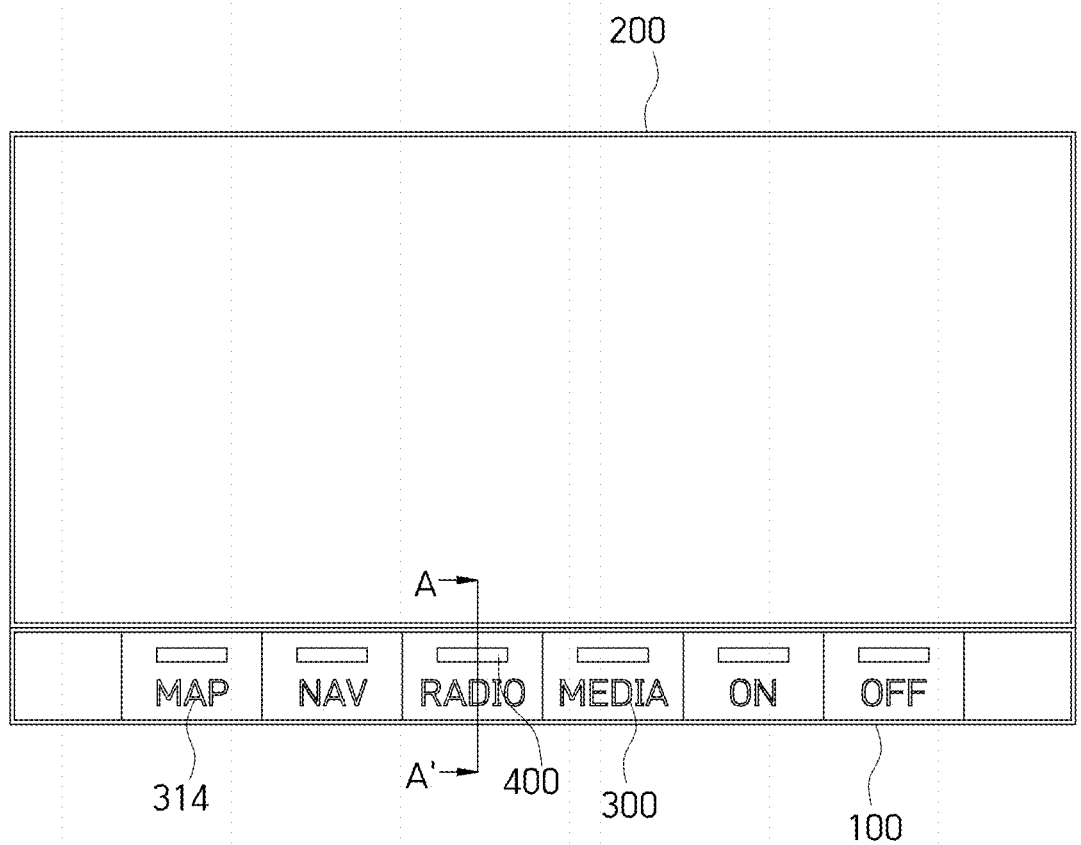
FIG. 1 is a front view illustrating a vehicle AV system according to an embodiment of the present disclosure.

Embodiments of the present disclosure are provided to more completely explain the present disclosure to those skilled in the art. The following embodiments may be modified in various forms, and the scope of the present disclosure is not limited to the following embodiments. The embodiments are provided to make the present disclosure more thorough and complete, and to completely convey the spirit of the present disclosure to those skilled in the art. In addition, in the following drawings, each constituent element may be exaggerated for the convenience and clarity of description. In the drawings, the same reference numerals refer to the same elements. The term "and/or" used in the present specification includes any one, one or more, or all the combinations of listed related items.

The terms used in the present specification are for explaining the particular embodiments, not for limiting the present disclosure.

The singular expressions used in the present specification may include the plural expressions unless the context clearly dictates otherwise. The terms "comprise (include)" and/or "comprising (including)" used in the present specification are intended to specify the presence of the mentioned shapes, numbers, steps, operations, members, elements, and/or groups thereof, but do not exclude presence or addition of one or more other shapes, numbers, steps, operations, members, elements, and/or groups thereof.

Hereinafter, the embodiments of the present disclosure will be described in detail with reference to the accompanying drawings.

Figure 2:
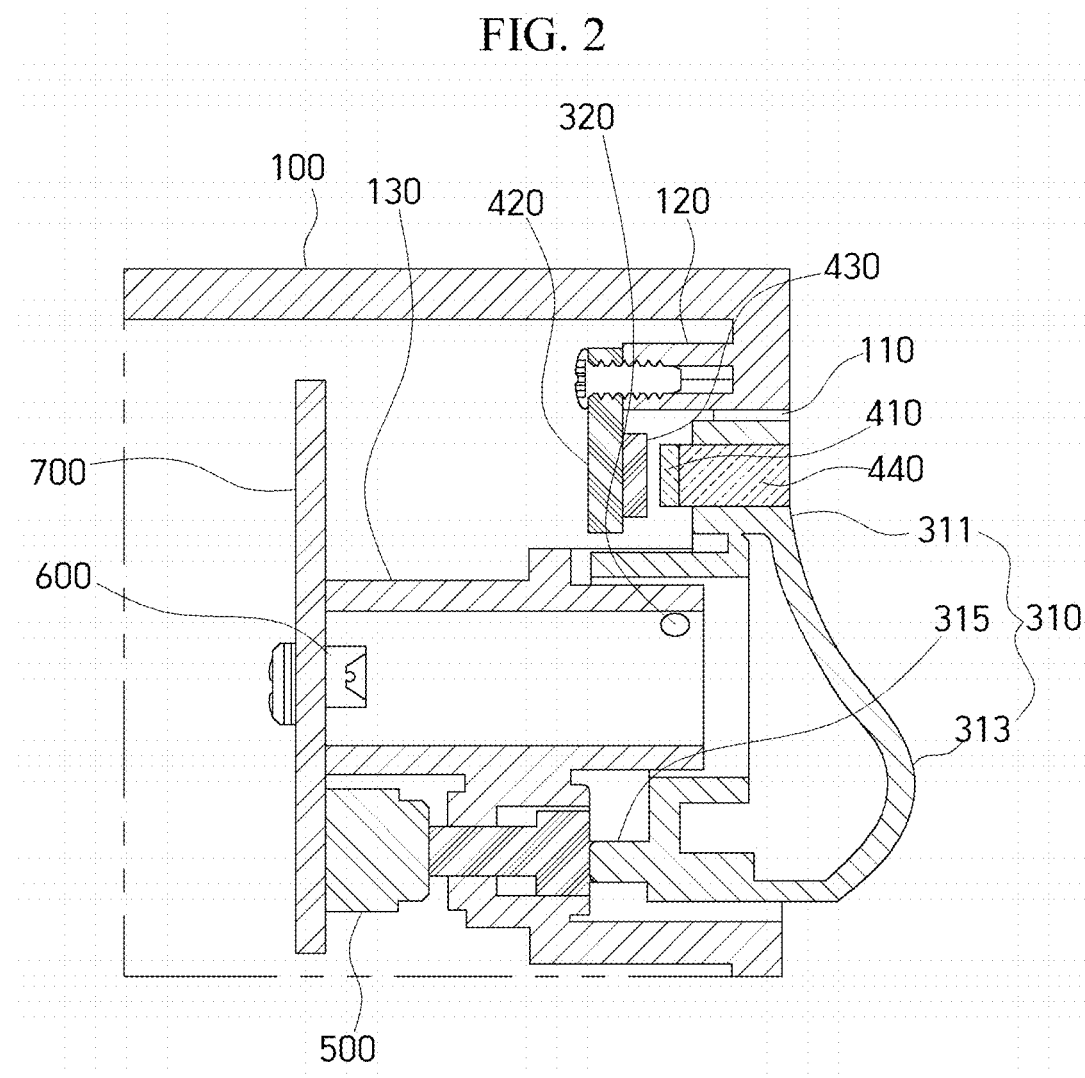
FIG. 2 is a cross-sectional view taken along line A-A' illustrated in FIG. 1.
Figure 3:
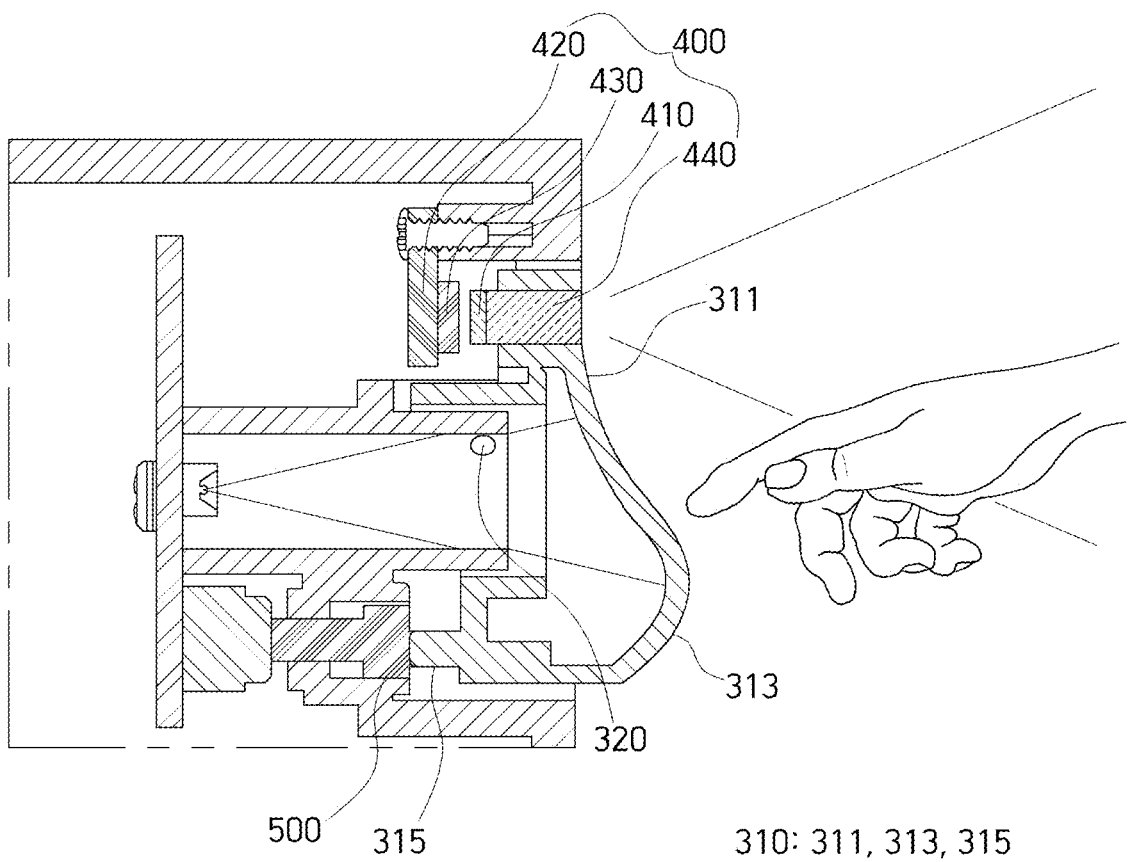
FIGS. 3 and 4 are operational views illustrating operating states of a button structure for a vehicle AV system according to the embodiment of the present disclosure.
Figure 4:
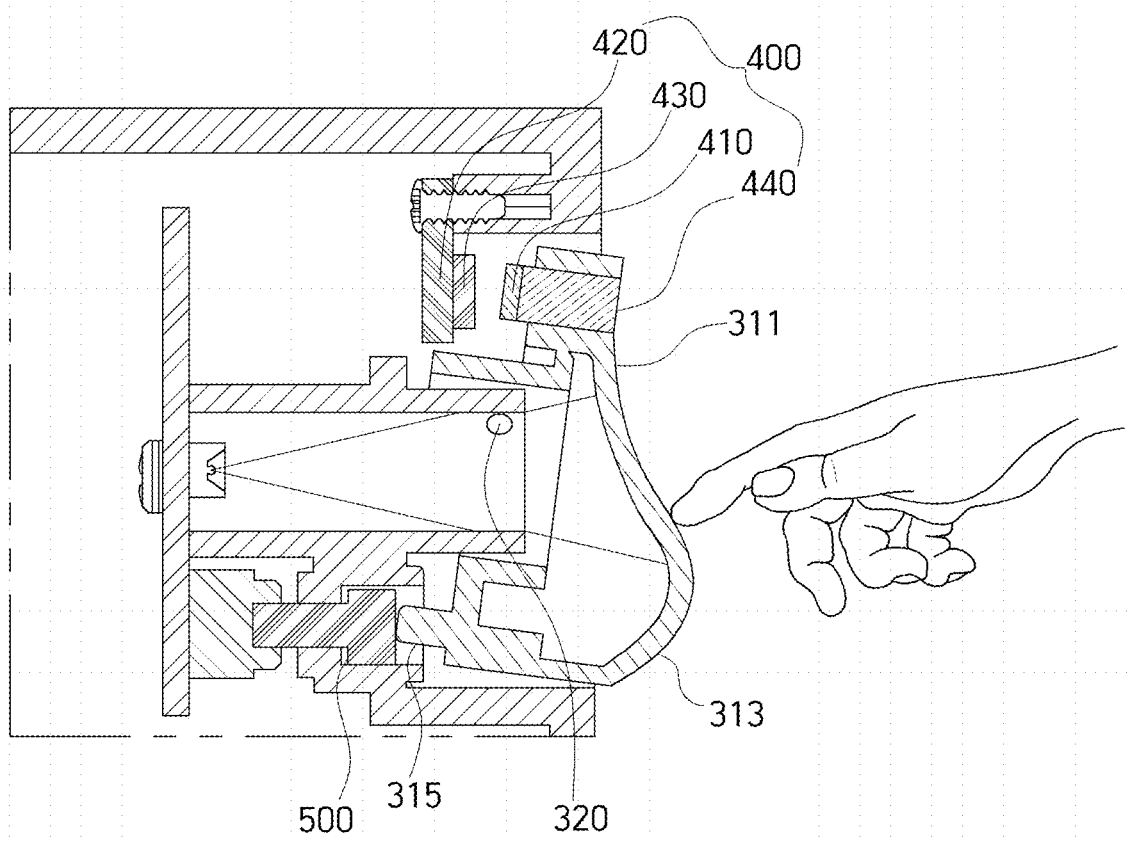
Figure 5:
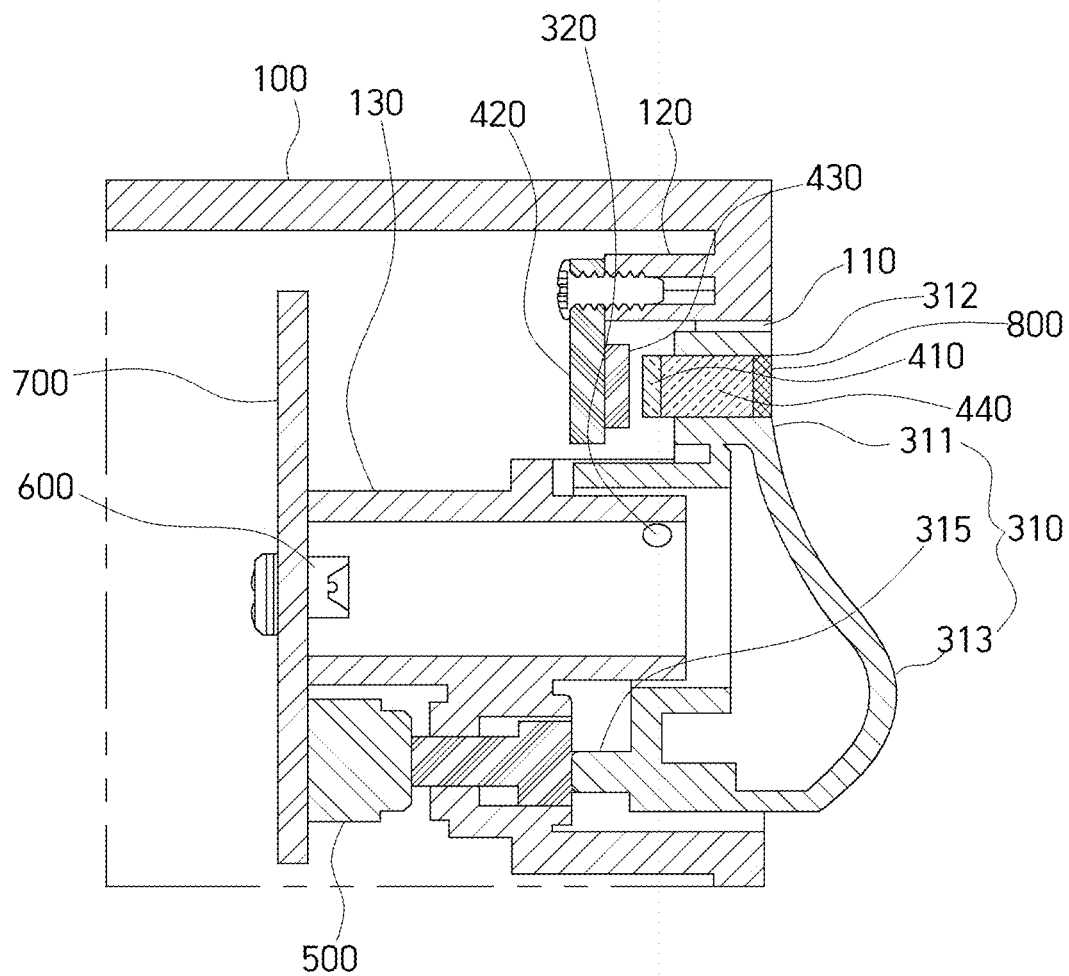
FIG. 5 is a cross-sectional view of a button structure for a vehicle AV system according to another embodiment of the present disclosure.

FIG. 1 is a front view illustrating a vehicle AV system according to an embodiment of the present disclosure, FIG. 2 is a cross-sectional view taken along line A-A' illustrated in FIG. 1, FIGS. 3 and 4 are operational views illustrating operating states of a button structure for a vehicle AV system according to the embodiment of the present disclosure, and FIG. 5 is a cross-sectional view of a button structure for a vehicle AV system according to another embodiment of the present disclosure.

Referring to FIGS. 1 to 5, the button structure for a vehicle AV system according to the embodiment of the present disclosure includes a front panel 100, a screen unit 200, button units 300, a switch 500, a detection unit, a lighting unit 600, and a printed circuit board (PCB) 700.

The front panel 100 defines a body of the vehicle AV system. The button units 300 are mainly mounted on the front panel 100, and various components such as the switch 500, the lighting unit 600, and the PCB 700 are accommodated in the front panel 100.

The front panel 100 includes a mounting hole 110, a coupling part 120, and a guide part 130.

The mounting hole 110 is provided in plural, and the plurality of mounting holes 110 is formed in a front surface of the front panel 100 that is directed toward an interior of an occupant compartment.

Further, the plurality of button units 300 is respectively mounted in the mounting holes 110.

Meanwhile, the mounting hole 110 has an inner diameter larger than an outer diameter of the button unit 300.

Therefore, the button unit 300 may be easily mounted in the mounting hole 110 and exposed to the interior of the occupant compartment from the front panel 100 through the mounting hole 110.

The coupling part 120 extends from a rear surface of the front panel 100 in a direction toward an engine room of the vehicle.

Further, the coupling part 120 is particularly disposed above the mounting hole 110.

The detection unit 400 is coupled to the coupling part 120.

The guide part 130 is formed in the front panel 100 and guides a direction of light emitted from the lighting unit 600.

The button unit 300 is rotatably coupled to the guide part 130.

The screen unit 200 is an output unit configured to display information related to the AV system so that a driver may visually and easily recognize necessary information. The screen unit 200 is disposed at an upper side of the front panel 100. The screen unit 200 receives output signals from the outside and outputs various types of information.

The plurality of button units 300 is respectively accommodated in the plurality of mounting holes 110 formed in the front surface of the front panel 100.

Further, the driver or passenger may manipulate the button units 300 to adjust volume, turning on/off, and frequency tuning of the AV system such as an audio system or a CD player mounted in a center fascia in the vehicle or adjust a heating or cooling mode of an air conditioning device so that the driver may drive the vehicle in a comfortable state.

The button unit 300 includes a body part 310 and a rotary shaft 320.

The body part 310 defines a body of the button unit 300 and is mounted in each of the plurality of mounting holes 110.

Further, the body part 310 has an outer diameter smaller than an inner diameter of the mounting hole 110.

Therefore, the body part 310 may be easily mounted in the mounting hole 110 and exposed to the interior of the occupant compartment from the front panel 100 through the mounting hole 110.

The body part 310 includes a planar portion 311, a pressing portion 315, and a push portion 313.

The planar portion 311 is formed in an upper region of the body part 310, and the detection unit 400 is coupled to a rear side of the planar portion 311 based on the direction toward the engine room.

To this end, a through-hole 312 may be formed in an upper portion of the planar portion 311, and the detection unit 400 may be coupled to the through-hole 312.

The push portion 313 is formed in a lower region of the body part 310, i.e., below the planar portion 311. The push portion 313 extends downward from the planar portion 311.

Further, the push portion 313 is configured to be pushed by the driver or passenger and allows the driver or passenger to adjust volume, turning on/off, or frequency tuning of the AV system in the vehicle or adjust the heating or cooling mode of the air conditioning device.

Further, a surface of the push portion 313 directed toward the interior of the occupant compartment further protrudes than a surface of the planar portion 311 directed toward the interior of the occupant compartment.

That is, in general, when manipulating the button unit 300, the driver or passenger presses the button unit 300 downward from above. As described above, the surface of the push portion 313 directed toward the interior of the occupant compartment further protrudes than the surface of the planar portion 311 directed toward the interior of the occupant compartment. Therefore, the driver or passenger may easily push the push portion 313 according to the present disclosure.

In particular, the surface of the push portion 313 directed toward the interior of the occupant compartment further protrudes than the surface of the planar portion 311 directed toward the interior of the occupant compartment. Therefore, the detection unit 400 fixed to the planar portion 311 may effectively detect the hand of the driver or passenger even though the hand of the driver or passenger moves downward when the driver or passenger pushes the push portion 313.

Meanwhile, a display portion 314 is formed on the push portion.

The display portion 314 displays various types of information related to the vehicle particularly for adjusting volume, turning on/off, and frequency tuning of an AVN device such as the audio system or the CD player mounted in the center fascia in the vehicle and adjusting the heating or cooling mode of the air conditioning device so that the driver drives the vehicle in a comfortable state. The driver or passenger may identify various types of information related to the vehicle by the light emitted from the lighting unit 600.

The pressing portion 315 extends from a rear side of the push portion 313. When the driver or passenger pushes the push portion 313 and the body part 310 rotates about the rotary shaft 320, the pressing portion 315 extending from the rear side of the push portion 313 presses the switch 500.

The rotary shaft 320 is formed rearward of the body part 310 and fixes the body part 310 to the guide part 130 so that the body part 310 is rotatable.

Therefore, the body part 310 may easily rotate about the rotary shaft 320 from the mounting hole 110 of the front panel 100.

Meanwhile, an elastic member such as a torsion spring may of course be provided on the rotary shaft 320 so that the body part 310 may return to an original position after the driver or passenger pushes and releases the push portion 313.

The detection unit 400 is provided in plural, and the plurality of detection units 400 is accommodated in the front panel 100 and respectively corresponds to the button units 300. In particular, the detection unit 400 detects the user's hand by emitting infrared rays.

That is, the detection unit 400 may be an infrared sensor.

Further, the detection unit 400 is provided in the front panel 100 and disposed rearward of the button unit 300.

Therefore, the detection unit 400 may be prevented from exposed to the outside of the instrument panel.

Therefore, the detection unit 400 may improve the luxurious quality of the vehicle interior.

The detection unit 400 includes a prism 440, a light-emitting part 410, a support 420, and a light-receiving part 430.

The prism 440 is coupled to the through-hole 312 of the planar portion 311 constituting the body part 310 and disperses infrared rays emitted from the light-emitting part 410.

That is, the prism 440 disperses the infrared rays emitted from the light-emitting part 410 to a large range, thereby allowing the detection unit to effectively detect the position of the hand of the driver or passenger close to the button unit 300 to adjust volume, turning on/off, or frequency tuning of the AV system in the vehicle or adjust the heating or cooling mode of the air conditioning device.

The light-emitting part 410 is disposed in the housing and coupled to a rear side of the prism 440 based on the direction toward the engine room.

Further, the light-emitting part 410 emits infrared rays forward toward the interior of the occupant compartment.

That is, the light-emitting part 410 is coupled to the rear side of the prism 440 and emits the infrared rays forward, such that the infrared rays are emitted to the prism 440.

The support 420 is disposed rearward of the prism 440 and the light-emitting part 410 and fixed to the coupling part 120 formed in the front panel 100.

Further, the light-receiving part 430 is coupled to the support 420, such that the light-receiving part 430 may be fixed to the front panel 100.

The light-receiving part 430 is coupled to the support 420 and receives the infrared rays that is emitted from the light-emitting part 410, reflected by the hand of the driver or passenger, and then returned.

The light-receiving part 430 is coupled to the support 420 and disposed in the front panel 100.

That is, the prism 440 and the light-emitting part 410, which constitute the detection unit 400 according to the present disclosure, are coupled to the button unit 300, and the light-receiving part 430, which constitutes the detection unit 400, is coupled to the front panel 100.

Further, the light-receiving part 430 is disposed at a position spaced apart from the light-emitting part 410 at a distance.

Therefore, it is possible to minimize a loss of infrared rays when the infrared rays emitted from the light-emitting part 410 return to the light-receiving part 430.

In a state in which the driver or passenger does not push the button unit 300, i.e., the button unit 300 is not rotated about the rotary shaft 320, the light-receiving part 430 is disposed in the same line as the light-emitting part 410 and the prism 440.

In contrast, when the driver or passenger pushes the button unit 300 and the button unit 300 rotates about the rotary shaft 320, a distance from the light-receiving part 430 to the light-emitting part 410 and the prism 440 increases.

In this case, the detection unit 400 serves to detect the hand of the driver or passenger in the state in which the button unit 300 is not pushed, i.e., the button unit 300 is not rotated. Therefore, the detection unit 400 detects the hand of the driver or passenger in the state in which the light-emitting part 410 and the light-receiving part 430 are disposed on the same line. Therefore, the function of the detection unit 400 according to the present disclosure has no problem even though the button unit 300 rotates.

The switch 500 is mounted on the PCB 700 disposed in the front panel 100 and having an electric circuit. The switch 500 is turned on or off depending on whether the pressing portion 315 is pressed against the switch 500 by the rotation of the button unit 300.

Further, the switch 500 may detect whether the pressing portion 315 presses the switch 500 and transmit a detection signal to the PCB 700.

The lighting unit 600 is a light source configured to emit light. In particular, the lighting unit 600 is disposed in the front panel 100 and mounted on the PCB 700 and emits light toward the display portion 314 of the button unit 300.

That is, the light emitted from the lighting unit 600 illuminates the display portion 314, such that the user may easily identify various types of information related to the vehicle displayed on the display portion 314.

In this case, a light emitting diode (LED), a liquid crystal display (LCD), a bulb, or the like may be used as the lighting unit 600 as long as the lighting unit 600 emits the light toward the button unit 300.

The switch 500 and the lighting unit 600 are mounted on the PCB 700. Because the PCB 700 is a publicly-known technology, a specific description thereof will be omitted so as not to obscure the subject matter of the present disclosure.

Meanwhile, a smog layer 800 may be formed on the button unit 300 according to another embodiment of the present disclosure.

The smog layer 800 is coupled to the button unit 300 and disposed at a position corresponding to the detection unit 400. The smog layer 800 prevents the detection unit 400 from being exposed to the outside.

Further, the smog layer 800 has the same color as a front surface of the button unit 300.

Therefore, the smog layer 800 may improve the luxurious quality of the vehicle interior.

Hereinafter, a method of operating the vehicle AV system according to the embodiment of the present disclosure will be described.

FIGS. 6 to 10 are schematic views illustrating a method of operating the vehicle AV system according to the embodiment of the present disclosure.

To assist in understanding the method of operating the vehicle AV system according to the embodiment of the present disclosure, an example will be described in which a navigation system lastly being operated is being used on the screen unit 200 constituting the AV system.

Figure 6:
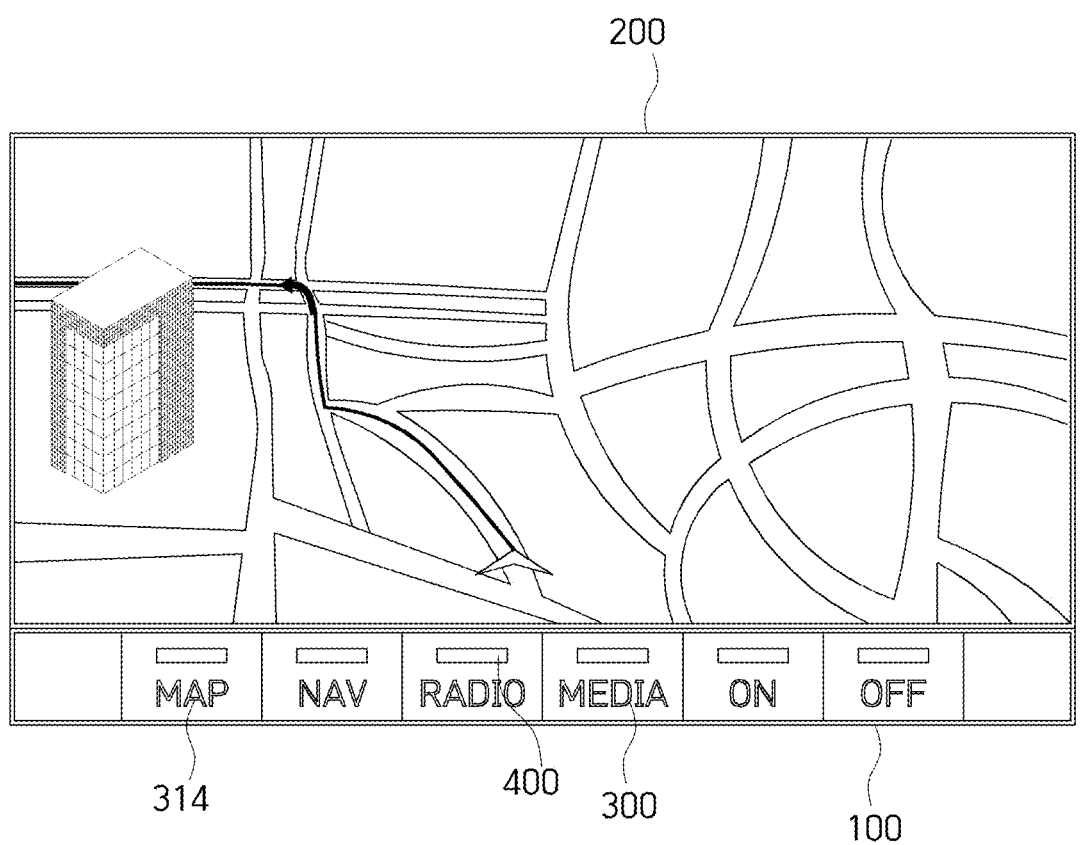
FIGS. 6 to 10 are schematic views illustrating a method of operating the vehicle AV system according to the embodiment of the present disclosure.

First, as illustrated in FIG. 6, in a case in which the user's hand is not detected by the detection unit 400, i.e., the user's hand is distant from the detection unit 400 while the navigation system is being used on the screen unit 200, the display portions 314 formed on the plurality of button units 300 are turned off, and the navigation system is outputted on the screen unit 200.

That is, the information being lastly operated is outputted on the screen unit 200.

Figure 7:
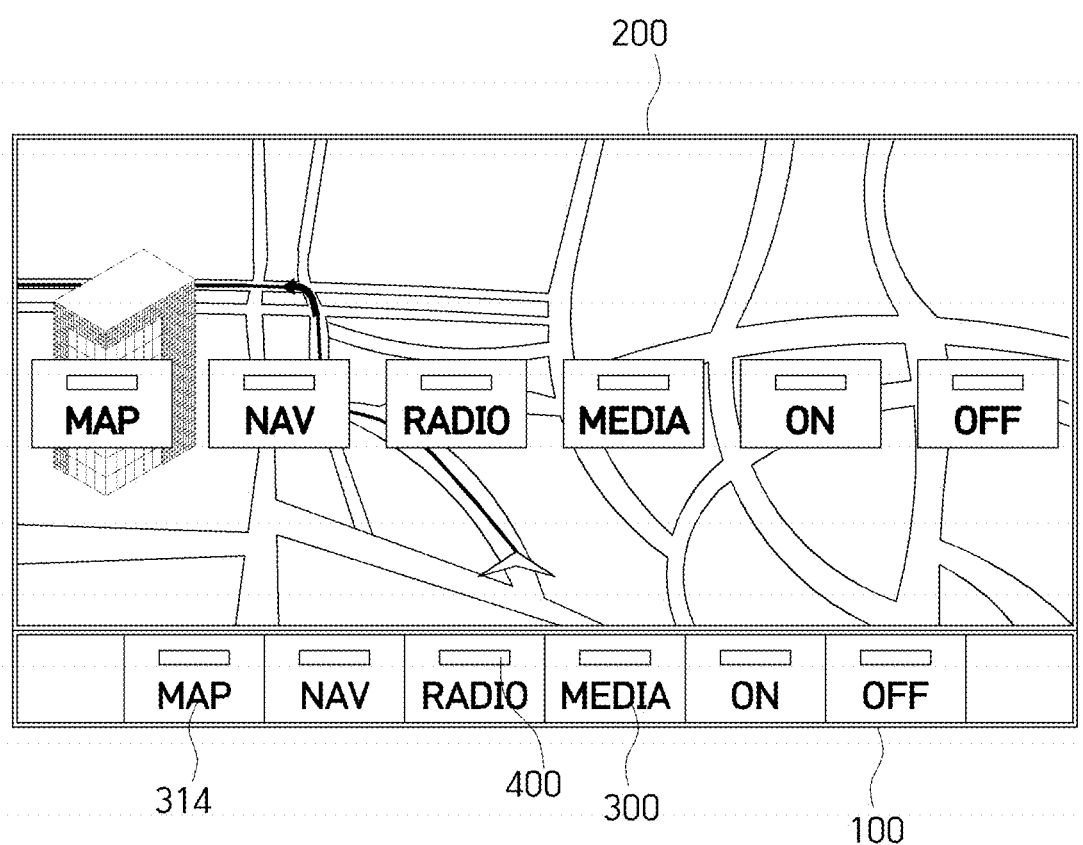

Further, as illustrated in FIG. 7, when the user's hand is as close as about 15 cm from the detection unit 400, the display portions 314 are turned on, and menus 900 corresponding to the plurality of button units 300 are outputted on the screen unit 200.

For example, the plurality of button units 300, i.e., the display portions 314 of the button units 300 for operating maps, the navigation system, radio broadcasts, media, and the like are illuminated, and the menus 900 indicating the maps, the navigation system, the radio broadcasts, the media, and the like are outputted on the screen unit 200.

Figure 8:
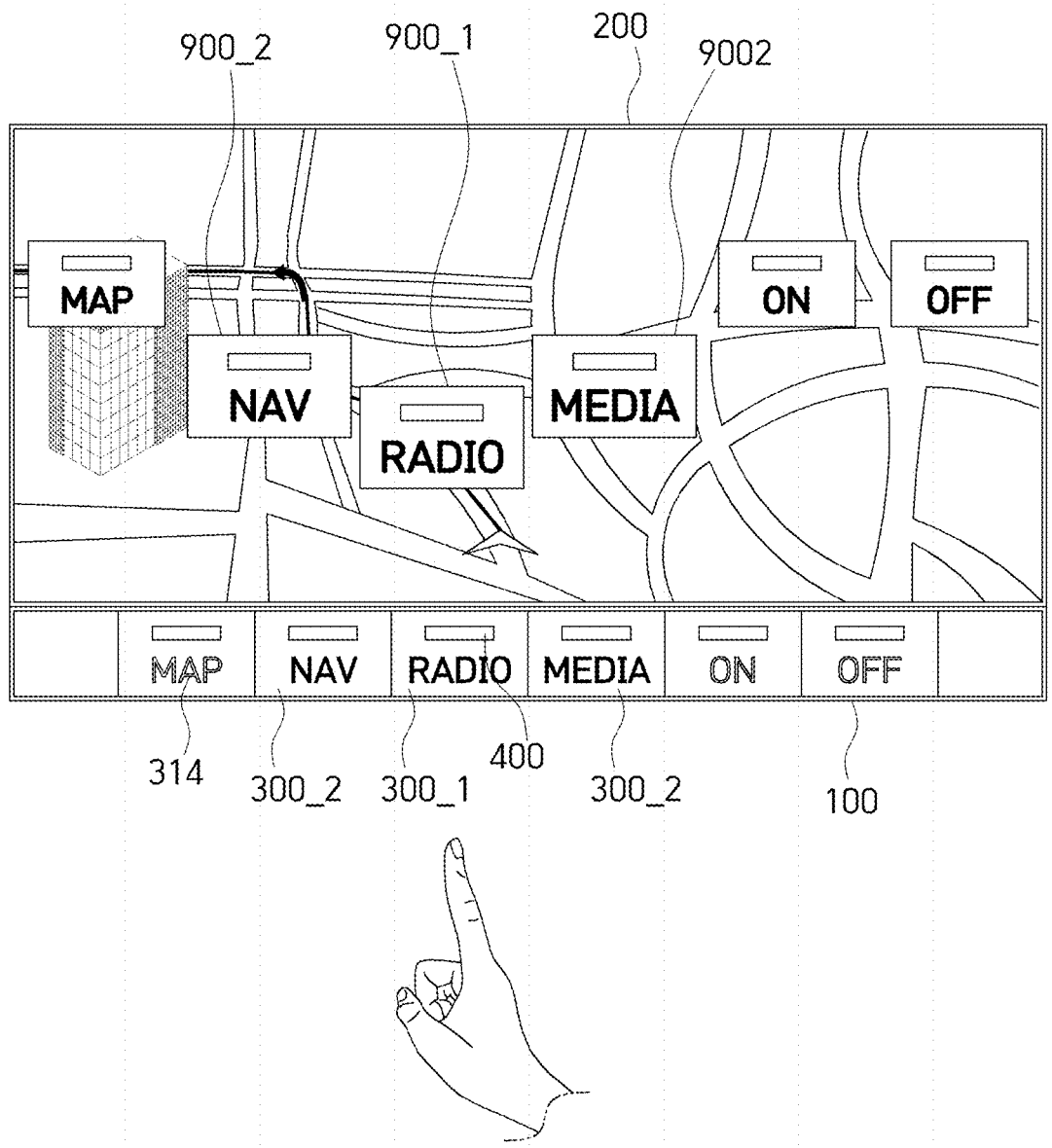

Next, as illustrated in FIG. 8, when the user's hand is as close as about 10 cm from the detection unit 400, the display portion 314 of a first button unit 300_1 closest to the user's hand and the display portions 314 of two second button units 300_2 close to the first button unit 300_1, among the plurality of button units 300, are turned on, and a first menu 900_1 and second menus 900_2 respectively corresponding to the first button unit 300_1 and the second button units 300_2 are enlarged and outputted on the screen unit 200.

For example, when the user's hand is close to a radio button unit 300 among the plurality of button units 300, the display portion 314 of the radio button unit 300 and the display portions 314 of a navigation button unit 300 and a media button unit 300, which are adjacent to the radio button unit 300, are turned on, and the display portion 314 of a map button unit 300 is turned off.

Further, the first menu 900_1 indicating a radio broadcast and the second menus 900_2 indicating the navigation system and the media are enlarged and outputted on the screen unit 200.

Further, when the position of the user's hand is close to the navigation button unit 300, the menu 900 indicating the navigation system may be the first menu 900_1.

In this case, the first menu 900_1 is larger than the second menu 900_2.

Therefore, the user may clearly identify which menu 900 the user points at.

Figure 9:
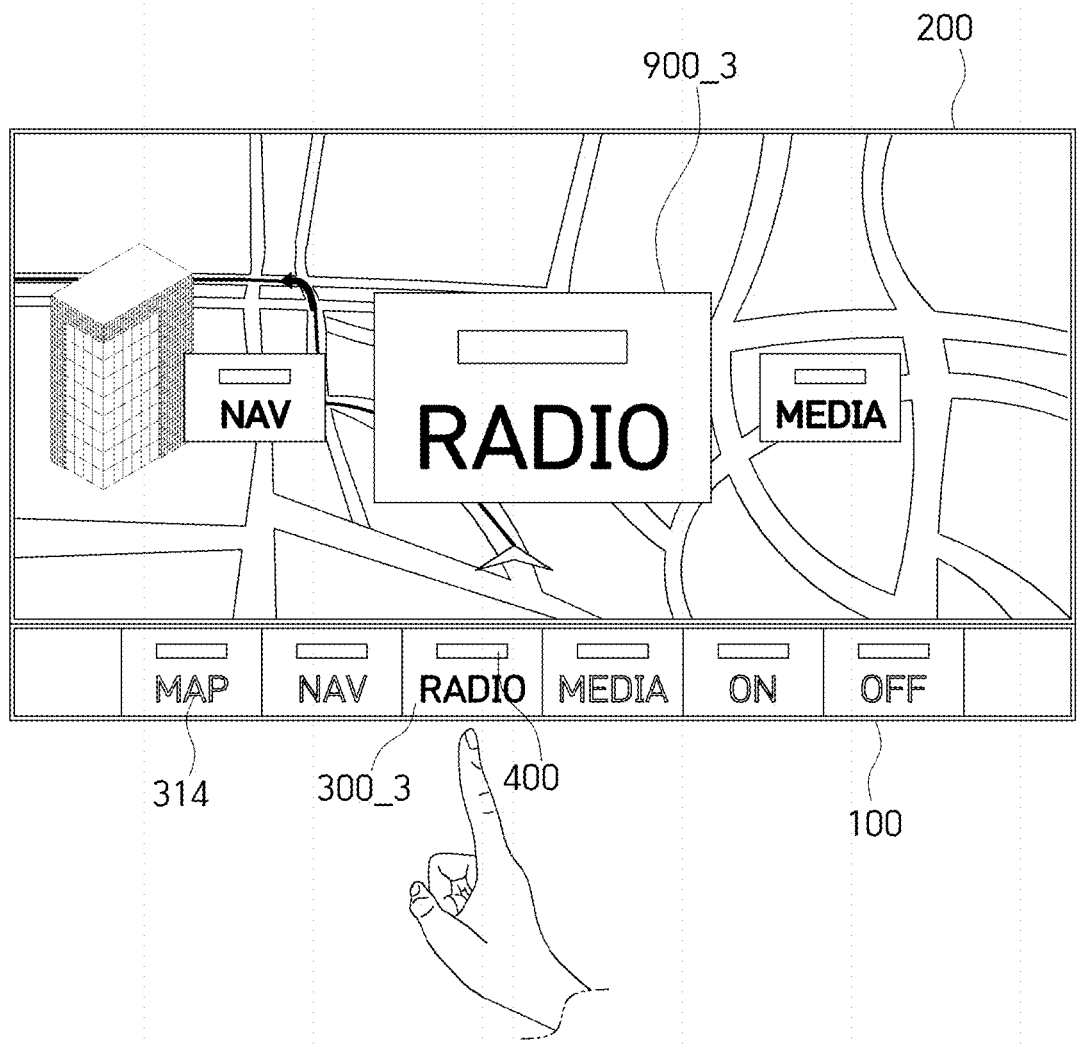

Next, as illustrated in FIG. 9, when the user's hand is as close as about 5 cm from the radio button unit 300 among the plurality of button units 300, only the display portion 314 of a third button unit 300_3 closest to the user's hand, among the plurality of button units 300, is turned on, and a third menu 900_3 corresponding to the third button unit 300_3 is enlarged and outputted on the screen unit 200.

For example, when the user's hand is close to the radio button unit 300 among the plurality of button units 300, only the display portion 314 of the radio button unit 300 is turned on.

Further, the third menu 900_3 indicating the radio broadcast is enlarged and outputted on the screen unit 200.

In this case, the third menu 900_3 is larger than the first menu 900_1.

Therefore, the user may clearly identify which menu 900 the user intends to select.

Figure 10:
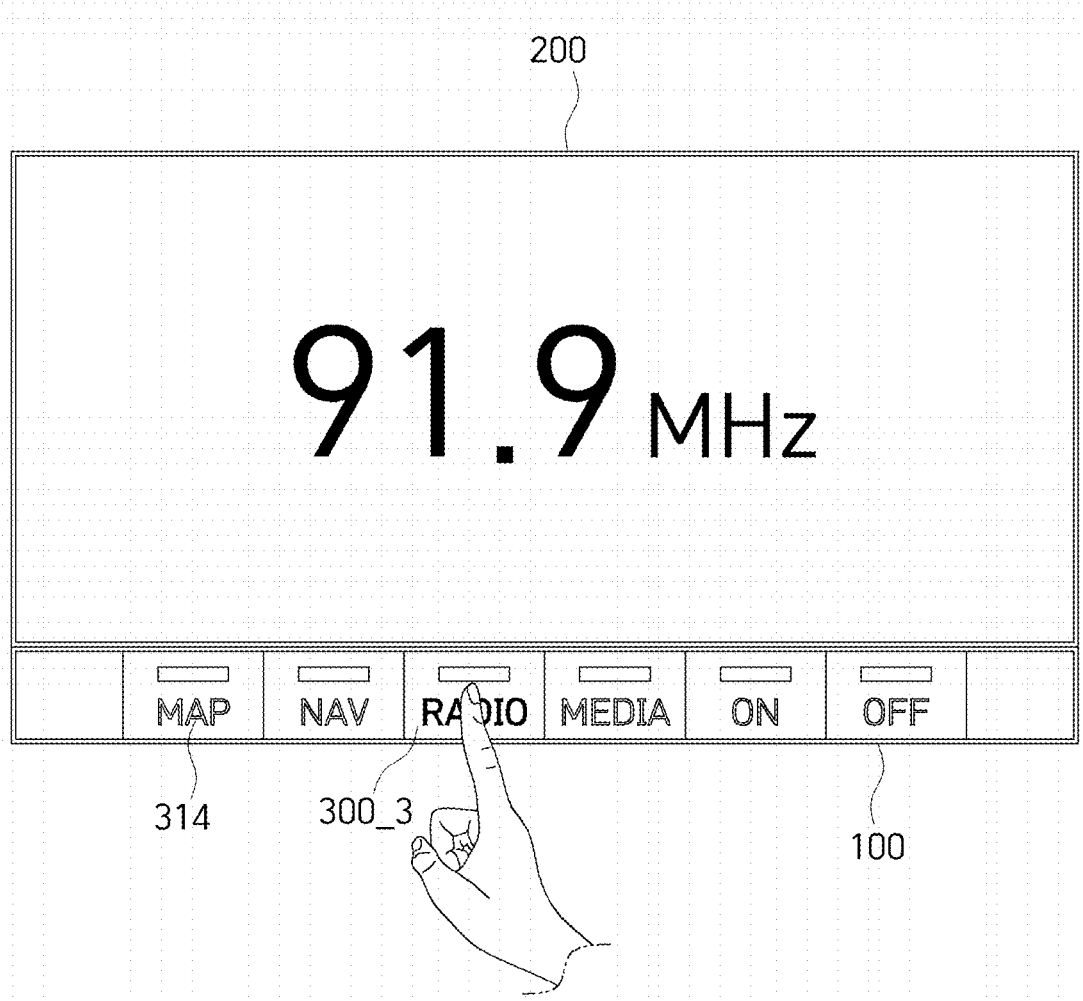

Next, as illustrated in FIG. 10, when the user's hand presses the button unit 300, a function corresponding to the corresponding button unit 300 is outputted on the screen unit 200.

For example, when the user's hand presses the radio button unit 300, the screen unit 200 switches from a navigation mode to a radio mode.

As described above, according to the button structure for a vehicle AV system according to the present disclosure, the surface of the push portion 313 directed toward the interior of the occupant compartment may further protrude than the surface of the planar portion 311 directed toward the interior of the occupant compartment, such that the driver or passenger may easily push the push portion 313.

In particular, the detection unit 400 fixed to the planar portion 311 may effectively detect the hand of the driver or passenger even though the hand of the driver or passenger moves downward.

In addition, the detection unit 400 may be provided in the front panel 100, disposed rearward of the button unit 300, and prevented from being exposed to the outside of the instrument panel, which may improve the luxurious quality of the vehicle interior.

Further, the prism 440 may disperse the infrared rays emitted from the light-emitting part 410 to a large range, thereby allowing the detection unit to effectively detect the position of the hand of the driver or passenger close to the button unit 300 to adjust volume, turning on/off, or frequency tuning of the AV system in the vehicle or adjust the heating or cooling mode of the air conditioning device.

Accordingly, the embodiments disclosed in the present specification should be considered as being not restrictive but illustrative. The scope of the present disclosure is defined by claims rather than the above-mentioned description, and all the differences in the equivalent scope thereto should be construed as falling within the scope of the present disclosure.

What is claimed is:

1. A button structure for a vehicle AV system, the button structure comprising:
   a front panel configured to define a body and having a mounting hole formed in a front surface of the front panel directed toward an interior of an occupant compartment;
   a button unit accommodated in the mounting hole and configured to selectively control AV systems of a vehicle;
   a detection unit accommodated in the front panel and configured to detect a user's hand, wherein the detection unit comprises:
      a prism coupled to a through-hole of the body part;
      a light-emitting part coupled to a rear side of the prism and configured to emit infrared rays toward the interior of the occupant compartment, wherein the light-emitting part and the prism are rotated together with the body part;
      a support fixed to the coupling part; and
      a light-receiving part coupled to the support and configured to receive the infrared rays that are emitted from the light-emitting part, reflected by a hand of a driver or passenger, and then returned;
   a switch unit configured to operate the AV systems of the vehicle under the control of the button unit; and
   a lighting unit accommodated in a housing and configured to emit light to the button unit in response to a detection signal from the detection unit,
   wherein the detection unit is disposed rearward of the button unit in the direction toward the interior of the occupant compartment.

2. The button structure of claim 1, wherein the front panel comprises:
   a plurality of mounting holes formed in the front surface of the front panel directed toward the interior of the occupant compartment;
   a coupling part extending from a rear surface of the front panel; and
   a guide part to which the button unit is rotatably coupled to.

3. The button structure of claim 2, wherein the button unit comprises:
   a body part configured to define a body; and
   a rotary shaft disposed rearward of the body part and configured to fix the body part to the guide part so that the body part is rotatable.

4. The button structure of claim 3, wherein an outer diameter of the body part is smaller than an inner diameter of the mounting hole.

5. The button structure of claim 3, wherein the body part comprises:
a planar portion formed in an upper region thereof;
a push portion formed in a lower region of the planar portion; and
a pressing portion extending from a rear side of the push portion.

6. The button structure of claim 5, wherein a surface of the push portion directed toward the interior of the occupant compartment protrudes further than a surface of the planar portion directed toward the interior of the occupant compartment.

7. The button structure of claim 1, wherein the prism disperses the infrared rays emitted from the light-emitting part so that the detection unit detects the hand of the driver or passenger close to the button unit.

8. A button structure for a vehicle AV system, the button structure comprising:
a front panel configured to define a body and having a mounting hole formed in a front surface of the front panel directed toward an interior of an occupant compartment;
a button unit accommodated in the mounting hole and configured to selectively control AV systems of a vehicle;
a detection unit provided in the front panel, disposed rearward of the button unit, and positioned from the button unit in a direction opposite to the direction toward the interior of the occupant compartment, the detection unit being configured to detect a user's hand, wherein the detection unit comprises:
a prism coupled to a through-hole of the body part;
a light-emitting part coupled to a rear side of the prism and configured to emit infrared rays toward the interior of the occupant compartment, wherein the light-emitting part and the prism are rotated together with the body part;
a support fixed to the coupling part; and
a light-receiving part coupled to the support and configured to receive the infrared rays that are emitted from the light-emitting part, reflected by a hand of a driver or passenger, and then returned;
a switch unit configured to operate the AV systems of the vehicle under the control of the button unit;
a lighting unit accommodated in a housing and configured to emit light to the button unit in response to a detection signal from the detection unit; and
a smog layer coupled to the button unit, disposed at a position corresponding to the detection unit, and configured to prevent the detection unit from being exposed.

9. The button structure of claim 8, wherein the smog layer has a same color as a front surface of the button unit.

10. A method of operating a button structure for a vehicle AV system,
wherein the vehicle AV system comprises:
a front panel configured to define a body and having a plurality of mounting holes formed in a front surface of the front panel directed toward an interior of an occupant compartment;
a screen unit disposed above the front panel and configured to receive an output signal and output information;
button units respectively accommodated in the plurality of the mounting holes and configured to selectively control AV systems of a vehicle;
display portions formed on the plurality of button units are turned off when the user's hand is not detected by the detection units,
the plurality of display portions are turned on when the user's hand is about 15 cm from the detection unit,
the display portion of a first button unit closest to the user's hand and the display portions of two second button units close to the first button unit, among the plurality of button units, are turned on when the user's hand is about 10 cm from the detection unit, and
only the display portion of a third button unit closest to the user's hand, among the plurality of button units, is turned on when the user's hand is about 5 cm from the detection unit;
a plurality of detection units accommodated in the front panel respectively corresponding to the button units and being configured to detect a user's hand; and
a plurality of lighting units accommodated in a housing, disposed rearward of the button units, and configured to emit light to the button units in response to detection signals from the detection units, said method comprising:
turning on or off the plurality of the lighting units based a distance from the user's hand detected by the detection units.

11. The method of claim 10, wherein: information being lastly operated is output on the screen unit when the user's hand is not detected by the detection units,
menus corresponding to the plurality of the button units are output on the screen unit when the user's hand is about 15 cm from the detection unit,
a first menu and a second menu respectively corresponding to the first button unit and the second button unit, among the plurality of button unit, are enlarged and output on the screen unit when the user's hand is about 10 cm from the detection unit, and
a third menu corresponding to the third button unit is output when the user's hand is about 5 cm from the third button unit among the plurality of button units.

12. The method of claim 11, wherein the plurality of menus is output on the information being lastly operated on the screen unit.

* * * * *